US012763029B2

(12) United States Patent
Kim et al.

(10) Patent No.: US 12,763,029 B2
(45) Date of Patent: Oct. 13, 2026

(54) DISPLAY DEVICE, AND ELECTRONIC DEVICE INCLUDING THE SAME

(71) Applicant: Samsung Display Co., LTD., Yongin-si (KR)

(72) Inventors: Keun Woo Kim, Yongin-si (KR); Hyoung Do Kim, Yongin-si (KR); Joon Seok Park, Yongin-si (KR); Ae Ran Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/170,198

(22) Filed: Apr. 4, 2025

(65) Prior Publication Data

US 2025/0384842 A1 Dec. 18, 2025

(30) Foreign Application Priority Data

Jun. 18, 2024 (KR) ........................ 10-2024-0078777
Sep. 5, 2024 (KR) ........................ 10-2024-0121032

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0426* (2013.01); *G09G 2300/0852* (2013.01)

(58) Field of Classification Search
None
See application file for complete search history.

(56) References Cited

U.S. PATENT DOCUMENTS 10,482,817 B2 11/2019 Kim et al.
10,540,927 B2 1/2020 Park et al.
(Continued)

FOREIGN PATENT DOCUMENTS

CN 108154846 00 4/2022
KR 102566551 B1 8/2023
(Continued)

OTHER PUBLICATIONS

S. M. Sze et al., "Physics of semiconductor devices", John Willey & Sons, Inc., p. 39, 2007.
(Continued)

*Primary Examiner* — Aneeta Yodichkas
(74) *Attorney, Agent, or Firm* — CANTOR COLBURN LLP

(57) ABSTRACT

A pixel includes: a first transistor connected to second node and having a gate electrode connected to a first node; a second transistor connected between a data line and the first node and having a gate electrode connected to a first line; a third transistor connected between a reference power node and the first node and having a gate electrode electrically-connected to a second line; a fourth transistor connected between an initialization power node and a third node and having a gate electrode electrically connected to a third line; a fifth transistor connected between a drive power node and the first transistor and having a gate electrode connected to a first light emitting-control line;; a sixth transistor connected between the second node and the third node and having a gate electrode connected to a second-light emitting control line; and a light emitting element connected to the third node. The fourth, fifth and sixth transistors are N-type (LTPS) transistors.

20 Claims, 14 Drawing Sheets

(56) References Cited

U.S. PATENT DOCUMENTS

| | | | |
|---|---|---|---|
| 11,984,063 | B2 | 5/2024 | Lee |
| 2023/0196991 | A1 | 6/2023 | Zou et al. |

FOREIGN PATENT DOCUMENTS

| | | | |
|---|---|---|---|
| KR | 1020230123556 | A | 8/2023 |
| KR | 1020230131808 | A | 9/2023 |

OTHER PUBLICATIONS

Yao et al., "Temperature-dependent optical and electrical properties of InGaZnON thin films," Optical Materials Express, vol. 9, No. 9, Sep. 1, 2019, 8 pages.

FIG. 7

| TFT | \|Vgs\| | \|Vds\| |
|---|---|---|
| M1 | 0 | 0 |
| M2 | 13.1 | 0 |
| M3 | 16 | 0 |
| M4 | 13.1 | 13.1 |
| M5 | 16 | 2.9 |
| M6 | 16 | 0 |
| M7 | 16 | 16 |
| M8 | 13.1 | 0 |

FIG. 9

| TFT | \|Vgs\| | \|Vds\| |
|---|---|---|
| M1 | 3.9 | 3.9 |
| M2 | 13.1 | 0 |
| M3 | 12.1 | 12.1 |
| M4 | 3.9 | 2.9 |
| M5 | 2.9 | 2.9 |
| M6 | 4 | 0 |
| M7 | 12 | 0 |
| M8 | 13.1 | 0 |

FIG. 11

| TFT | \|Vgs\| | \|Vds\| |
|---|---|---|
| M1 | 16 | 4.9 |
| M2 | 3 | 0 |
| M3 | 11.9 | 14.9 |
| M4 | 11.9 | 0 |
| M5 | 16 | 16 |
| M6 | 4.1 | 0 |
| M7 | 11.9 | 0 |
| M8 | 0 | 0 |

FIG. 13

| TFT | \|Vgs\| | \|Vds\| |
|---|---|---|
| M1 | 13 | 13 |
| M2 | 12.8 | 12.8 |
| M3 | 3.2 | 0.2 |
| M4 | 13 | 0 |
| M5 | 16 | 16 |
| **M6** | **11.7** | **14.7** |
| M7 | 11.7 | 0 |
| M8 | 16 | 16 |

DISPLAY DEVICE, AND ELECTRONIC DEVICE INCLUDING THE SAME

This application claims priority to Korean patent application No. 10-2024-0078777, filed on Jun. 18, 2024, and Korean patent application No. 10-2024-0121032, filed on Sep. 5, 2024, and all the benefits accruing therefrom under 35 U.S.C. § 119, the contents of which in their entirety is herein incorporated by reference.

TECHNICAL FIELD

Embodiments of the present disclosure relate to a display device, and an electronic device including the same.

DISCUSSION OF THE RELATED ART

The importance of display devices is increasing with the development of multimedia. In line with this, the use of display devices such as organic light emitting displays ("OLEDs") and liquid crystal displays ("LCDs") is rising.

The display device includes a plurality of pixels. Each pixel includes a plurality of transistors, a light emitting element electrically connected to the transistors, and a capacitor. The transistors generate a drive current based on signals provided by signal wires, and the light emitting element emits light based on the drive current.

The content set forth above is only intended to help understanding of the background of the technical ideas of the present disclosure and, therefore, it should not be understood as corresponding to prior art known to those skilled in the art to which the present disclosure pertains.

SUMMARY

Embodiments of the present disclosure provide a display device with improved efficiency and a electronic device including the same.

A electronic device according to an embodiment of the present disclosure includes a processor to provide input image data, and a display device to display an image based on the input image data, the display device including pixels, wherein any one pixel among the pixels includes a first transistor, which has a gate electrode connected to a first node and is connected between a second node and a first drive power node to which a first drive power is supplied, a second transistor connected between a data line and the first node and having a gate electrode electrically connected to a first scan line, a third transistor connected between a reference power node, to which a reference power is supplied, and the first node and having a gate electrode electrically connected to a second scan line, a fourth transistor connected between an initialization power node, to which an initialization power is supplied, and a third node and having a gate electrode electrically connected to a third scan line, a fifth transistor connected between the first drive power node and the first transistor and having a gate electrode electrically connected to a first light emitting control line, a sixth transistor connected between the second node and the third node and having a gate electrode electrically connected to a second light emitting control line, and a light emitting element connected to the third node, where the fourth transistor, the fifth transistor, and the sixth transistor are N-type low-temperature poly-silicon ("LTPS") transistors.

The first transistor may be an oxide semiconductor transistor.

The second and third transistors may be the oxide semiconductor transistors.

The pixel may further include a first capacitor connected between the first node and the second node and a second capacitor connected between the first drive power node and the second node.

The first transistor may further include one electrode of the second capacitor and a back gate electrode connected to the second node.

The light emitting element may be connected between the third node and a second drive power node to which a second drive power is supplied.

A display device including a pixel according to an embodiment of the present disclosure includes pixels connected with scan lines, light emitting control lines, and data lines, and a scan driver for driving the scan lines, wherein any one of the pixels includes: a first transistor, which has a gate electrode connected to a first node and is connected between a second node and a first drive power node, to which a first drive power is supplied, a second transistor connected between a data line and the first node and having a gate electrode electrically connected to a first scan line of the scan lines, a third transistor connected between a reference power node, to which a reference power is supplied, and the first node and having a gate electrode electrically connected to a second scan line of the scan lines, a fourth transistor connected between an initialization power node to which an initialization power is supplied, and a third node and having a gate electrode electrically connected to a third scan line of the scan lines, a fifth transistor connected between the first drive power node and the first transistor and having a gate electrode electrically connected to a first light emitting control line of the light emitting control lines, a sixth transistor connected between the second node and the third node and having a gate electrode electrically connected to a second light emitting control line of the light emitting control lines, and a light emitting element connected to the third node, where the fourth transistor, the fifth transistor, and the sixth transistor are N-type low-temperature poly-silicon (LTPS) transistors.

The first transistor may be an oxide semiconductor transistor.

The second and third transistors may be the oxide semiconductor transistors.

The display device may further include a first capacitor connected between the first node and the second node and a second capacitor connected between the first drive power node and the second node.

The scan driver may include stage circuits, which are connected with the scan lines, where any one of the stage circuits may include seventh transistors connected in series between an input terminal and a fourth node and having gate electrodes connected to a first clock terminal to which a first clock signal is supplied, eighth and ninth transistors connected in series between a second power terminal, to which a second power is supplied, and the fourth node, a tenth transistor connected between the first clock terminal and a fifth node and having a gate electrode connected to the fourth node, an eleventh transistor connected between a first power terminal, to which a first power is supplied, and the fifth node and having a gate electrode connected to the first clock terminal, a twelfth transistor connected between the fourth node and a sixth node and having a gate electrode connected to the first power terminal, a thirteenth transistor connected between a second clock terminal, to which a second clock signal is supplied, and an output terminal and having a gate electrode connected to the sixth node, and a fourteenth transistor connected between the output terminal and the second power terminal and having a gate electrode connected to the fifth node.

The seventh transistors, the eighth transistor, the tenth transistor, the eleventh transistor, the thirteenth transistor, and the fourteenth transistor may be N-type low-temperature poly-silicon (LTPS) transistors.

The ninth transistor and the twelfth transistor may be oxide semiconductor transistors.

A gate electrode of the eighth transistor may be connected to the fifth node, and a gate electrode of the ninth transistor may be connected to the second clock terminal.

Any one of the stage circuits may further include a third capacitor connected between the sixth node and the output terminal and a fourth capacitor connected between the fifth node and the second power terminal.

The display device may further include a timing controller controlling the scan driver, wherein the input terminal may receive a start signal from the timing controller, and the output terminal may output a scan signal to any one of the scan lines in response to the first and second clock signals.

The first power may have a higher voltage than the second power.

The stage circuits may be included in an integrated gate driver ("IGD").

An display device according to an embodiment of the present disclosure includes: pixels connected with scan lines, light emitting control lines, and data lines; and a scan driver for driving the scan lines. The scan driver includes stage circuits, which are connected with the scan lines, where any one of the stage circuits includes: seventh transistors connected in series between an input terminal and a fourth node and having gate electrodes connected to a first clock terminal to which a first clock signal is supplied, eighth and ninth transistors connected in series between a second power terminal, to which a second power is supplied, and the fourth node, a tenth transistor connected between the first clock terminal and a fifth node and having a gate electrode connected to the fourth node, an eleventh transistor connected between a first power terminal, to which a first power is supplied, and the fifth node and having a gate electrode connected to the first clock terminal, a twelfth transistor connected between the fourth node and a sixth node and having a gate electrode connected to the first power terminal, a thirteenth transistor connected between a second clock terminal, to which a second clock signal is supplied, and an output terminal and having a gate electrode connected to the sixth node, and a fourteenth transistor connected between the output terminal and the second power terminal and having a gate electrode connected to the fifth node, and the first transistors, the second transistor, the fourth transistor, the fifth transistor, the seventh transistor, and the eighth transistor are N-type low-temperature poly-silicon (LTPS) transistors.

The third transistor and the sixth transistor may be oxide semiconductor transistors.

BRIEF DESCRIPTION OF THE DRAWINGS

FIG. 6 and FIG. 7 are diagrams for illustrating an operation of a first period of FIG. 5.

FIG. 8 and FIG. 9 are diagrams for illustrating an operation of a second period of FIG. 5.

FIG. 10 and FIG. 11 are diagrams for illustrating an operation of a third period of FIG. 5.

FIG. 12 and FIG. 13 are diagrams for illustrating an operation of a fourth period of FIG. 5.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or periods, these elements, components, regions, layers and/or periods should not be limited by these terms. These terms are only used to distinguish one element, component, region, layer or period from another element, component, region, layer or period. Thus, "a first element," "component," "region," "layer" or "period" discussed below could be termed a second element, component, region, layer or period without departing from the teachings herein.

It will be understood that when an element is referred to as being "connected to" another element, it can be directly connected to the other element or intervening elements may be present therebetween. In contrast, when an element is referred to as being "directly connected to" another element, there are no intervening elements present.

Figure 1:
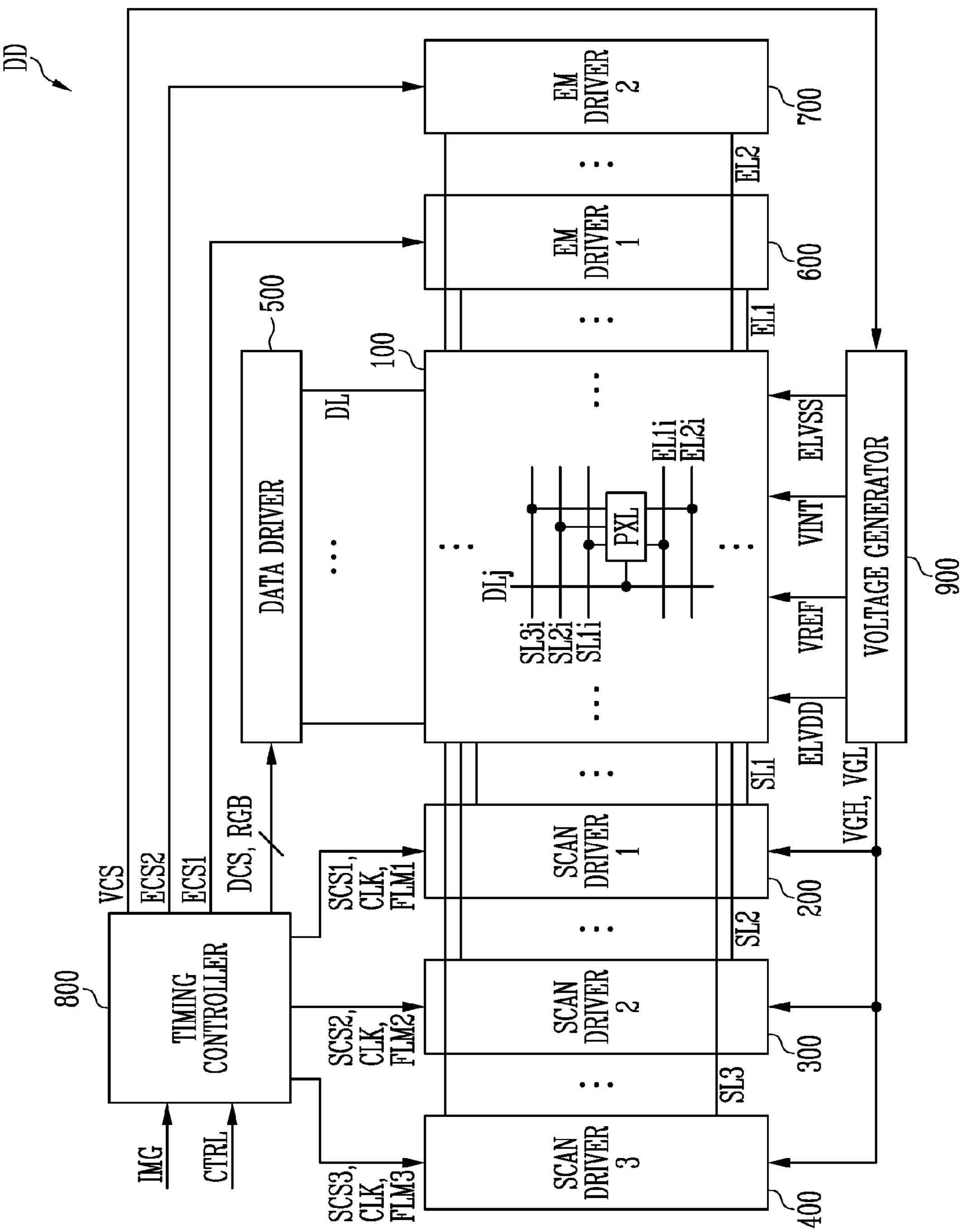
FIG. 1 is a block diagram of a display device according to an embodiment of the present disclosure.

FIG. 1 is a block diagram of a display device according to an embodiment of the present disclosure.

Referring to FIG. 1, a display device DD according to an embodiment of the present disclosure may include a display panel 100, scan drivers 200, 300, and 400, a data driver 500, light emitting drivers ("EM drivers") 600 and 700, and a timing controller 800.

In embodiments, the display device DD may further include a power supply 900 to supply a voltage of a first drive power ELVDD, a voltage of a second drive power ELVSS, a voltage of an initialization power VINT, and a voltage of a reference power VREF to the display panel 100. The power supply 900 may supply a first power VGH and a second power VGL to the scan drivers 200, 300, and 400. However, it is illustrative only, and at least one of the first drive power ELVDD, the second drive power ELVSS, the initialization power VINT, and the reference power VREF may be supplied from the data driver 500 or the timing controller 800.

The power supply 900 may operate in response to a voltage control signal VCS supplied from the timing controller 800. For example, the power supply 900 may be configured to generate a plurality of voltages by receiving an input voltage from the outside of the display device DD, adjusting the received voltage, and regulating the adjusted voltage.

The first drive power ELVDD and the second drive power ELVSS may be used to drive a light emitting element. To this end, the voltage of the first drive power ELVDD may be set to a higher level than that of the second drive power ELVSS. For example, the first drive power ELVDD may be a positive voltage, and the second drive power ELVSS may be a negative voltage.

The initialization power VINT may be a power to initialize pixels PXL. For example, a drive transistor included in the pixels PXL may be initialized by the voltage of the initialization power VINT. The initialization power VINT may be set to a lower voltage than a data signal.

The reference power VREF may be a power that initializes the pixels PXL. For example, capacitors and/or transistors included in the pixels PXL may be initialized by the voltage of the reference power VREF. The reference power VREF may be a positive voltage. For example, the reference power VREF may have the same voltage level as the first drive power ELVDD, but embodiments are not limited thereto.

The display panel 100 may include pixels PXL that are connected to data lines DL, scan lines SL1, SL2, SL3, SL4, and light emitting control lines EL1, EL2, respectively. The pixels PXL may be supplied with the first drive power ELVDD, the second drive power ELVSS, the initialization power VINT, and the reference power VREF from the outside. In embodiments, the pixels disposed in an i-th (where i is a natural number) row and a j-th (where j is a natural number) column may be joined (or connected) with the scan lines SL1i, SL2i, SL3i corresponding to the i-th pixel row, the light emitting control lines EL1i, EL2i corresponding to the i-th pixel row, and the data line DLj corresponding to the j-th pixel column. However, embodiments are not limited thereto. For example, signal lines SL1, SL2, SL3, EL1, EL2, DL that are connected to the pixels PXL may be set in various ways in response to a circuit structure of the pixels PXL.

Each pixel PXL may include at least one light emitting element that is configured to generate light. Accordingly, each pixel PXL may generate light of specific colors, such as red, green, blue, cyan, magenta, and yellow.

The scan drivers 200, 300, and 400 may be distinguished by the configuration and operation of the first scan driver 200, the second scan driver 300, and the third scan driver 400. However, the classification of scan drivers 200, 300, and 400 may be for the ease of explanation, and depending on the design, at least some of the scan drivers may be integrated into a single drive circuit and module.

The first scan driver 200 may supply a first scan signal to the first scan lines SL1 in response to a first drive control signal SCS1 supplied from the timing controller 800. For example, the first scan driver 200 may receive a first scan start signal FLM1 and generate the first scan signal while shifting the first scan start signal FLM1 in response to a clock signal CLK. The first scan driver 200 may sequentially supply the first scan signal to the first scan lines SL1. When the first scan signal is supplied sequentially, the pixels PXL may be selected as a horizontal line unit (i.e., a pixel row unit), and the data signal may be supplied to the pixels PXL. In other words, the first scan signal may be a signal used for data input. The first scan signal may be set as a gate-on voltage (e.g., a high level). The transistor included in the pixels PXL and receiving the first scan signal may be set to a turn-on state when the first scan signal is supplied.

The second scan driver 300 may supply a second scan signal to the second scan lines SL2 in response to a second drive control signal SCS2 supplied from the timing controller 800. For example, the second scan driver 300 may receive a second scan start signal FLM2 and generate a second scan signal while shifting the second scan start signal FLM2 in response to the clock signal CLK. The second scan driver 300 may sequentially supply the second scan signal to the second scan lines SL2. The second scan signal may be supplied for initialization of the pixels PXL and/or threshold voltage (Vth) compensation of the drive transistor. The second scan signal may be set as the gate-on voltage (e.g., a high level). The transistor included in the pixels PXL and receiving the second scan signal may be set to a turn-on state when the second scan signal is supplied.

The third scan driver 400 may supply a third scan signal to the third scan lines SL3 in response to a third drive control signal SCS3 supplied from the timing controller 800. For example, the third scan driver 400 may receive a third scan start signal FLM3 and generate the third scan signal while shifting the third scan start signal FLM3 in response to the clock signal CLK. The third scan driver 400 may sequentially supply the third scan signal to the third scan lines SL3. The third scan signal may be supplied for the initialization of the drive transistor included in the pixels PXL. The third scan signal may be set to the gate-on voltage (e.g., a high level). The transistors included in the pixels PXL and receiving the third scan signal may be set to a turn-on state when the third scan signal is supplied.

The scan drivers 200, 300, and 400 may be disposed on one side of the display panel 100. However, embodiments are not limited thereto. For example, the scan drivers 200, 300, and 400 may be disposed on one side of the display panel 100 and on the other side of the display panel 100 as opposed to the one side. As such, the scan drivers 200, 300, and 400 may be formed in the display panel 100 in various forms according to the embodiments.

The first light emitting driver 600 may supply a first light emitting control signal to the first light emitting control lines EL1 in response to a fourth drive control signal ECS1 supplied from the timing controller 800. For example, the first light emitting driver 600 may sequentially supply the first light emitting control signal to the first light emitting control lines EL1. When the first light emitting control signal is supplied, the pixels PXL may be set to a light emitting state. To this end, the first light emitting control signal may be set to a gate-on voltage (e.g., a high level) so that the transistors included in the pixels PXL may be turned on. The transistor included in the pixels PXL and receiving the first light emitting control signal may be turned on when the first light emitting control signal is supplied and be set to a turn-off state in other cases. The first light emitting control signal may be used to control an emission time of the pixels PXL.

The second light emitting driver 700 may supply a second light emitting control signal to the second light emitting control lines EL2 in response to a fifth drive control signal supplied from the timing controller 800. For example, the second light emitting driver 700 may sequentially supply the second light emitting control signal to the second light emitting control lines EL2. When the second light emitting control signal is supplied, the electrical connection of the light emitting element with the drive transistor included in each of the pixels PXL may be connected. To this end, the second light emitting control signal may be set to a gate-on voltage (e.g., a high level) so that the transistors included in the pixels PXL may be turned on. The transistors included in the pixels PXL and receiving the second light emitting control signal may be turned on when the second light emitting control signal is supplied and be set to a turn-off state in other cases. The second light emitting control signal may be used to control the emission time of the pixels PXL.

The data driver 500 may receive a sixth drive control signal DCS and image data RGB from the timing controller 800. The data driver 500 may supply the data signal to the data lines DL in response to the sixth drive control signal DCS. For example, the data driver 500 may generate an analog form of data signal using a digital form of image data RGB to supply the generated data signal to the data lines DL to be synchronized with the first scan signal.

The timing controller 800 may control all the operations of the display device DD. The timing controller 800 may receive an input image data IMG from the outside and a control signal CTRL to control the display thereof. The timing controller 800 may generate the first drive control signal SCS1, the second drive control signal SCS2, the third drive control signal SCS3, the fourth drive control signal ECS1, the fifth drive control signal ECS2, and the sixth drive control signal DCS in response to the control signal CTRL. In addition, the timing controller 800 may rearrange the input image data IMG into the image data RGB to supply to the data driver 500.

Two or more components of the data driver 500, the timing controller 800, and the power supply 900 may be mounted in a single integrated circuit. For example, the data driver 500, the timing controller 800, and the power supply 900 may be included in a driver integrated circuit DIC. In this case, the data driver 500, the timing controller 800, and the power supply 900 may be functionally distinct components within a single driver integrated circuit DIC. In other embodiments, at least one of the data driver 500, the timing controller 800, and the power supply 900 may be provided as a distinct component from the driver integrated circuit DIC.

Figure 2:
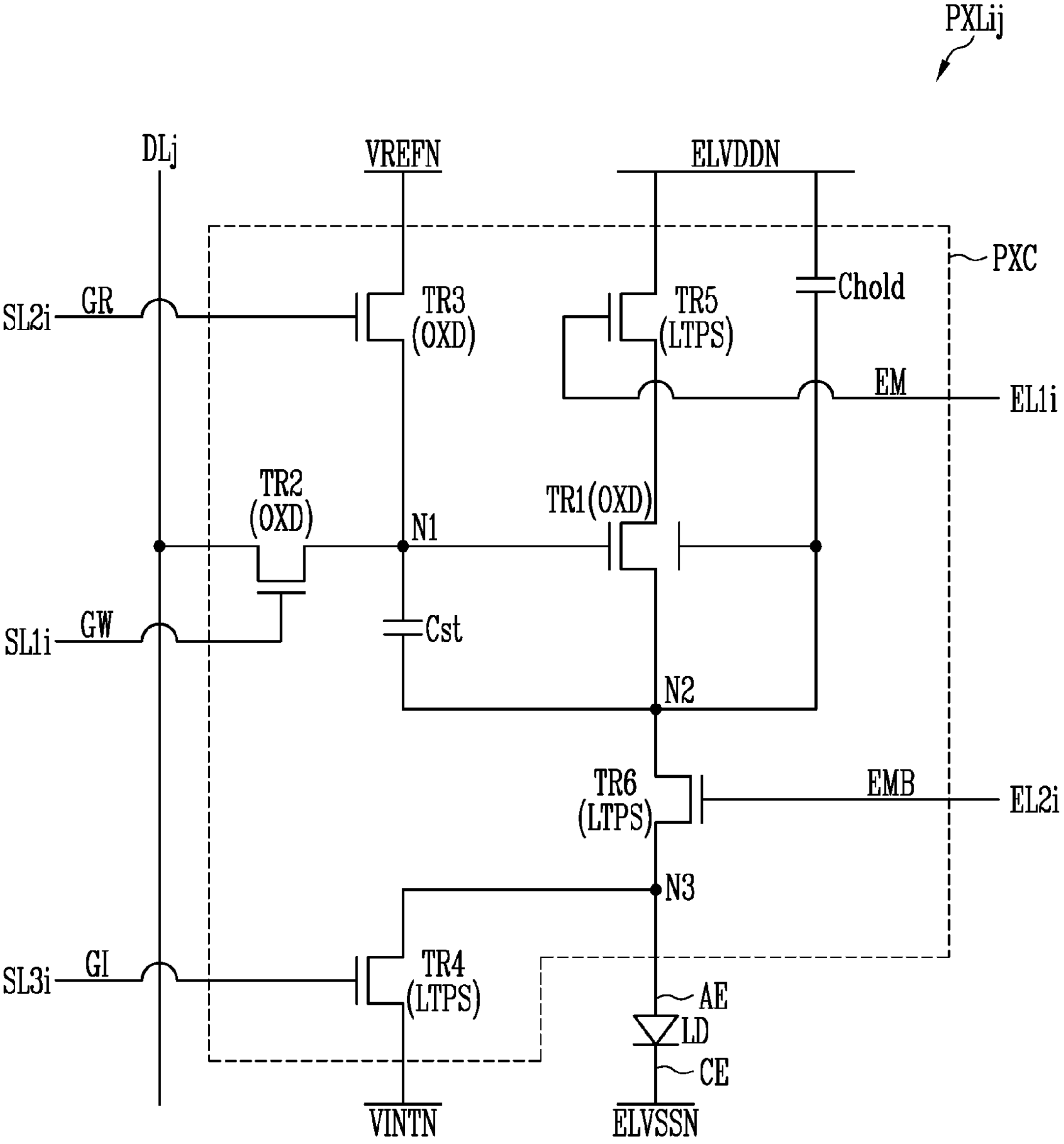
FIG. 2 is a circuit diagram illustrating an embodiment of any one of pixels of FIG. 1.

FIG. 2 is a circuit diagram illustrating an embodiment of any one of the pixels of FIG. 1. In FIG. 2, the types of transistors TR1~TR6 are shown in parentheses for a clear explanation. For example, an oxide semiconductor transistor is written as “OXD”, and an N-type low-temperature poly-silicon transistor as “LTPS”.

Referring to FIG. 2, a pixel PXLij may include a pixel circuit PXC and a light emitting element LD.

The pixel circuit PXC may be connected to the i-th first scan line SL1i, the i-th second scan line SL2i, the i-th third scan line SL1i, the i-th first light emitting control line EL1i, the i-th second light emitting control line EL2i, and the j-th data line DLj.

In embodiments, the pixel circuit PXC may include the N-type low-temperature poly-silicon (LTPS) transistors and the oxide semiconductor (OXD) transistors. For example, the first to third transistors TR1 to TR3 may be the oxide semiconductor transistors, and fourth to sixth transistors TR4 to TR6 may be the N-type low-temperature poly-silicon transistors.

The low-temperature poly-silicon transistor may include gate electrodes, source electrodes, and drain electrodes. The low-temperature poly-silicon transistors may include an active layer formed of polysilicon. For example, the low-temperature poly-silicon transistor may include the active layer formed of polysilicon obtained by recrystallization by subjecting amorphous silicon to heat treatment with an excimer laser. By recrystallizing the disordered form of amorphous silicon to form areas in the form of monocrystalline silicon, it is possible to increase the performance and efficiency of the low-temperature poly-silicon transistors by making in a form similar to single crystal silicon, which is the most ideal form for electron transfer.

Thus, the low-temperature poly-silicon transistor may have high electron mobility and, accordingly, may have fast driving characteristics. The low-temperature poly-silicon transistor may provide the desired amount of current in a short period of time, thereby minimizing the size of the transistor, improving image quality, and achieving high resolution.

The low-temperature poly-silicon transistor may be applied to a P-type or N-type transistor, but in embodiments of the present disclosure, the N type low-temperature poly-silicon transistor may be applied. For example, the N-type low-temperature poly-silicon transistor may have approximately 1.5 times higher electron mobility than the P-type low-temperature poly-silicon transistor.

As another example, in the P-type low-temperature poly-silicon transistor, the threshold voltage may fluctuate due to hysteresis in that an output current curve has a different value than the previous state as the gate voltage changes. Accordingly, in the P-type low-temperature poly-silicon transistors, afterimages such as image dragging may appear due to the fluctuating threshold voltage. On the other hand, in the N-type low-temperature poly-silicon transistor, it is possible to reduce hysteresis. Therefore, by applying the N-type low-temperature poly-silicon transistor instead of P-type low-temperature poly-silicon transistor, it is possible to improve degradation in the image quality caused by fluctuating threshold voltages.

The oxide semiconductor transistor may include the gate electrode, the source electrode, and the drain electrode. The oxide semiconductor transistor may include the active layer formed as an oxide semiconductor. Here, the oxide semiconductor may be amorphous or crystalline oxide semiconductors. For example, an oxide semiconductor may consist of any one selected from the group consisting of indium-gallium-zinc oxide (“IGZO”), zinc oxide (ZnO), indium oxide (InO), gallium oxide (GaO), tin oxide (SnO2), indium gallium oxide (“IGO”), indium zinc oxide (“IZO”), zinc tin oxide (“ZTO”), and indium zinc tin oxide (“IZTO”).

The oxide semiconductor transistor may be processed at low temperatures and have lower charge mobility than the low-temperature poly-silicon transistors. The oxide semiconductor transistor may have excellent off-current characteristics. For example, the oxide semiconductor thin-film transistor may have more excellent leakage current blocking properties than the N-type low-temperature poly-silicon transistors. Therefore, if particular transistors that are connected to one electrode of a capacitor to generate leakage current are formed as oxide semiconductor transistors, the leakage current may be minimized, thereby improving the display quality of the display device DD. Here, leakage current may refer to the current flowing between the source electrode and the drain electrode when the transistor is in the cut-off state, even though no channel has been formed.

The pixel circuit PXC may include first to sixth transistors TR1 to TR6.

The first transistor TR1 may be connected between a first drive power node ELVDDN and a second node N2. The gate electrode of the first transistor TR1 may be connected to a first node N1, whereby the first transistor TR1 may be turned on depending on a voltage level of the first node N1. The first transistor TR1 may further include a back gate electrode connected to one electrode of a second capacitor Chold and the second node N2. The first transistor TR1 may be referred to as a drive transistor.

The first transistor TR1 may be formed as the oxide semiconductor transistor. The probability that the tunneling may occur in the oxide semiconductor transistor may be relatively low. Therefore, the oxide semiconductor transistor may have more excellent leakage current blocking properties than the N-type low-temperature poly-silicon transistor. For example, by forming the first transistor TR1 as the oxide semiconductor transistor, front-of-screen ("FOS") performance may be improved, and the application range of infrared ray ("IR") sensors may be expanded.

The oxide semiconductor transistor may include a transparent active layer. The oxide semiconductor transistor may have an energy bandgap of more than three times that of low-temperature poly-silicon transistors. For example, the oxide semiconductor transistor may have an energy bandgap of 3.1 electron volts (eV) or greater, that is greater than the energy of visible light. Thereby, the active layer of the oxide semiconductor transistor does not absorb visible light, but transmits light, thereby securing transparent light properties.

On the other hand, the low-temperature poly-silicon transistor may have optical properties to absorb a relatively large amount of light. If an optical module is provided at the bottom of the display panel 100, the optical module may not be able to receive the required amount of light due to the low-temperature poly-silicon transistor. Therefore, if the optical module such as an infrared ray (IR) sensor is provided at the bottom of the display panel 100, with the transistors formed as the oxide semiconductor transistor, the optical module may receive light smoothly through the display panel 100. For example, by forming the first transistor TR1 as the oxide semiconductor transistor, the application range of the optical modules may be enlarged.

The second transistor TR2 may be connected between the j-th data line DLj and the first node N1. The gate electrode of the second transistor TR2 may be connected to the i-th first scan line SL1i, whereby the second transistor TR2 may be turned on in response to the scan signal (i.e., first scan signal GW) of the i-th first scan line SL1i. The second transistor TR2 may be referred to as a switching transistor.

The third transistor TR3 may be connected between the first node N1 and a reference power node VREFN. The gate electrode of the third transistor TR3 may be connected to the i-th second scan line SL2i, whereby the third transistor TR3 may be turned on in response to the scan signal (i.e., second scan signal GR) of the i-th second scan line SL2i.

The low-temperature poly-silicon transistor may generate relatively greater leakage currents than the oxide semiconductor transistors. It is assumed that the second and third transistors TR2, TR3 are formed as the low-temperature poly-silicon transistors. Due to the leakage current of the low-temperature poly-silicon transistor, a relatively large amount of low frequency noise or flicker noise may be generated upon operation at low frequencies.

Taking these into consideration, the second and third transistors TR2, TR3 may be formed as the oxide semiconductor transistors. For example, since the oxide semiconductor transistor has excellent leakage current blocking properties, it is possible to prevent unintentional voltage drops. Thus, if the second and third transistors TR2, TR3 are formed as the oxide semiconductor transistor, the leakage current may be reduced, thereby preventing an unintentional change in the voltage of the first node N1. For example, the oxide semiconductor transistor may improve image quality by minimizing voltage fluctuations caused by leakage currents inside the pixels. In addition, due to the excellent leakage current blocking characteristics of oxide semiconductor transistors, it may be easy to apply variable refresh rate ("VRR") upon operation at low frequencies.

The fourth transistor TR4 may be connected between a third node N3 and an initialization power node VINTN. The third node N3 may be a node connected to an anode electrode AE of the light emitting element LD. The initialization power node VINTN may be configured to transmit an initialization voltage. In embodiments, the initialization voltage may be provided by the power supply 900 of FIG. 1. In other embodiments, the initialization voltage may be provided by external devices. The gate electrode of the fourth transistor TR4 may be connected to the i-th third scan line SL3i, whereby the fourth transistor TR4 may be turned on in response to the scan signal (i.e., third scan signal GI) of the i-th third scan line SL3i.

The fourth transistor TR4 may be formed as the N-type low-temperature poly-silicon transistor. For example, if the fourth transistor TR4 is formed as a low-temperature poly-silicon transistor that has high electron mobility, a high actuation rate may be secured upon initializing operation.

The fifth transistor TR5 may be connected between the first drive power node ELVDDN and the first transistor TR1. The gate electrode of the fifth transistor TR5 may be connected to the i-th first light emitting control line EL1i, so that the fifth transistor TR5 may be turned on in response to the first light emitting control signal EM of the i-th first light emitting control line EL1i.

The sixth transistor TR6 may be connected between the second node N2 and the third node N3. The gate electrode of the sixth transistor TR6 may be connected to the i-th second light emitting control line EL2i, so that the sixth transistor TR6 may be turned on in response to the second light emitting control signal EMB of the i-th second light emitting control line EL2i.

The fifth and sixth transistors TR5, TR6 may be formed as the N-type low-temperature poly-silicon transistors. For example, if the fifth and sixth transistors TR5, TR6 are formed as the low-temperature poly-silicon transistors with high electron mobility, high actuation rate may be secured upon emission operation.

A subpixel circuit SPC may include a first capacitor Cst and the second capacitor Chold.

The first capacitor CST may be connected between the first node N1 and the second node N2. The first capacitor CST may store the voltage difference of the first node N1 and the second node N2. For example, the first capacitor Cst may store a voltage corresponding to the data signal and the threshold voltage of the first transistor TR1.

The second capacitor Chold may be connected between the first drive power node ELVDDN and the second node N2. One electrode of the second capacitor Chold may be connected to the back gate electrode of the first transistor TR1. The second capacitor Chold may have a higher storage capacity compared to the first capacitor Cst. For example, as the second capacitor Chold has a higher storage capacity compared to the first capacitor Cst, the second capacitor Chold may minimize the voltage change at the second node N2 in response to the voltage change of the first node N1.

The light emitting element LD may include the anode electrode AE, a cathode electrode CE, and a light emitting layer. The light emitting layer may be disposed between the anode electrode AE and the cathode electrode CE. After the data signal transmitted through the j-th data line DLj is applied to the voltage of the first node N1, the fifth and sixth transistors TR5, TR6 may be turned on when the light emitting control signals of the i-th first and second light emitting control lines EL1i, EL2i are enabled to a higher level. In addition, the first transistor TR1 may be turned on according to the voltage of the first node N1, whereby current may flow from the first drive power node ELVDDN to a second drive power node ELVSSN. The light emitting element LD may emit light depending on the amount of current flowing.

As such, the fourth to sixth transistors TR4 to TR6 that are positioned in a current supply path that supplies current to the light emitting element LD may be formed as the N-type low-temperature poly-silicon transistors, thereby improving the driving characteristics. Accordingly, upon the emission and initialization operation, the current may be stably supplied to the light emitting element LD. In addition, by forming the first and third transistors TR1 to TR3 as the oxide semiconductor transistors, the voltage fluctuations caused by leakage currents may be minimized, thereby improving the image quality.

Figure 3:
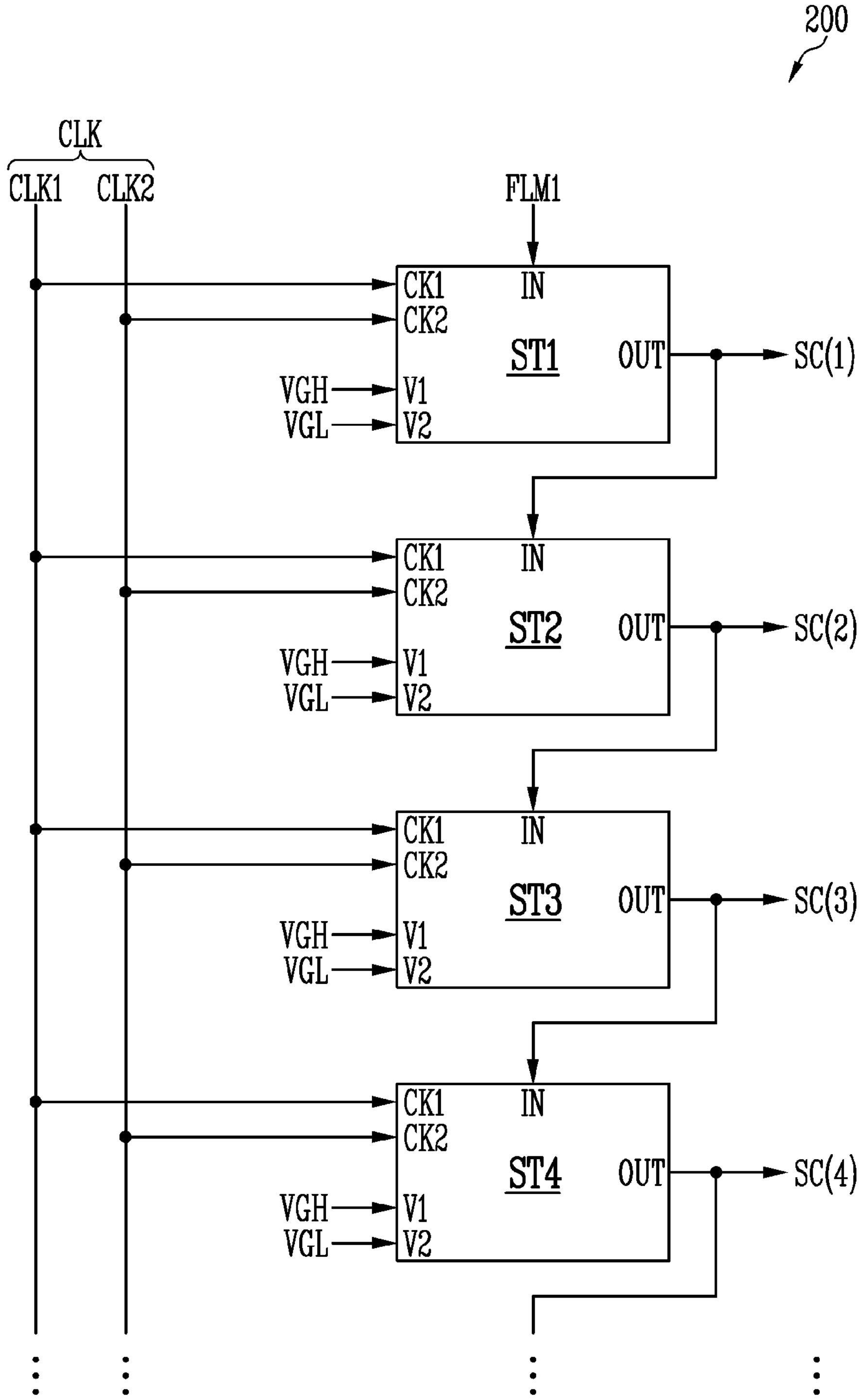
FIG. 3 is a block diagram of a scan driver according to an embodiment of the present disclosure.

FIG. 3 is a block diagram of a scan driver according to an embodiment of the present disclosure. In FIG. 3, the first scan driver 200 of the scan drivers 200, 300, and 400 is schematically illustrated for a clear and concise explanation. The second and third scan drivers 300 and 400 may be configured as the first scan driver 200.

Referring to FIG. 3, the first scan driver 200 may include a plurality of stages ST1, ST2, ST3, ST4.

In embodiments, the stages ST1, ST2, ST3, ST4 may be operated in response to the first and second clock signals CLK1, CLK2 that are supplied from the timing controller 800 (see FIG. 1). In addition, the stages ST1, ST2, ST3, ST4 may be implemented as the same stage circuit.

The stages ST1, ST2, ST3, ST4 may output scan signals SC(1), SC(2), SC(3), SC(4) in response to the first scan start signal FLM1.

Each of the stages ST1, ST2, ST3, ST4 may include an input terminal IN, a first clock terminal CK1, a second clock terminal CK2, a first power terminal V1, a second power terminal V2, and an output terminal OUT.

The input terminal IN may receive the first scan start signal FLM1. For example, the input terminal IN may receive the first scan start signal FLM1 from the timing controller 800. For example, the input terminal IN of the first stage ST1 may receive the first scan start signal FLM1 supplied from the timing controller 800. In addition, the input terminal IN for each of the second to fourth stages ST1~ST4 may be supplied with the output signal (i.e., a scan signal) of the previous scan stage. The first scan start signal FLM1 may control the first timing of the first scan signal output from the first scan driver 200.

The first and second clock terminals CK1, CK2 may receive first and second clock signals CLK1, CLK2. For example, the first and second clock terminals CK1, CK2 may receive clock signals CLK from the timing controller 800. The first and second clock signals CLK1, CLK2 may be used to shift the first scan start signal FLM1.

The first and second clock signals CLK1, CLK2 may be set to square wave signals that repeat high and low levels. For example, if the first clock signal CLK1 is high-level, the second clock signal CLK2 may be low-level. Also, if the second clock signal CLK2 is high-level, the first clock signal CLK1 may be low-level. Here, the high level may correspond to the gate-on voltage, and the low level may correspond to the gate-off voltage. However, the waveform relationship of the first and second clock signals CLK1, CLK2 is not limited thereto. In addition, the number of clock signals supplied to a single stage is not limited thereto.

The first power terminal V1 may receive a voltage of the first power VGH, and the second power terminal V2 may receive a voltage of the second power VGL. The first and second powers VGH, VGL may be configured as the gate-on voltage. For example, the voltage of the second power VGL may be set to a level lower than a level of the first power VGH.

The output terminal OUT may output any of the scan signals SC(1), SC(2), SC(3), SC(4). Any one of the scan signals SC(1), SC(2), SC(3), SC(4) may be supplied to the pixels (PXL, see FIG. 1) through the scan line corresponding thereto. For example, the output terminal OUT of the first stage ST1 may output the first scan signal SC(1) to the first scan line. The output terminal OUT of the second stage ST2 may output the second scan signal SC(2) to the second scan line. The output terminal OUT of the third stage ST3 may output the third scan signal SC(3) to the third scan line. The output terminal OUT of the fourth stage ST4 may output the fourth scan signal SC(4) to the fourth scan line.

Figure 4:
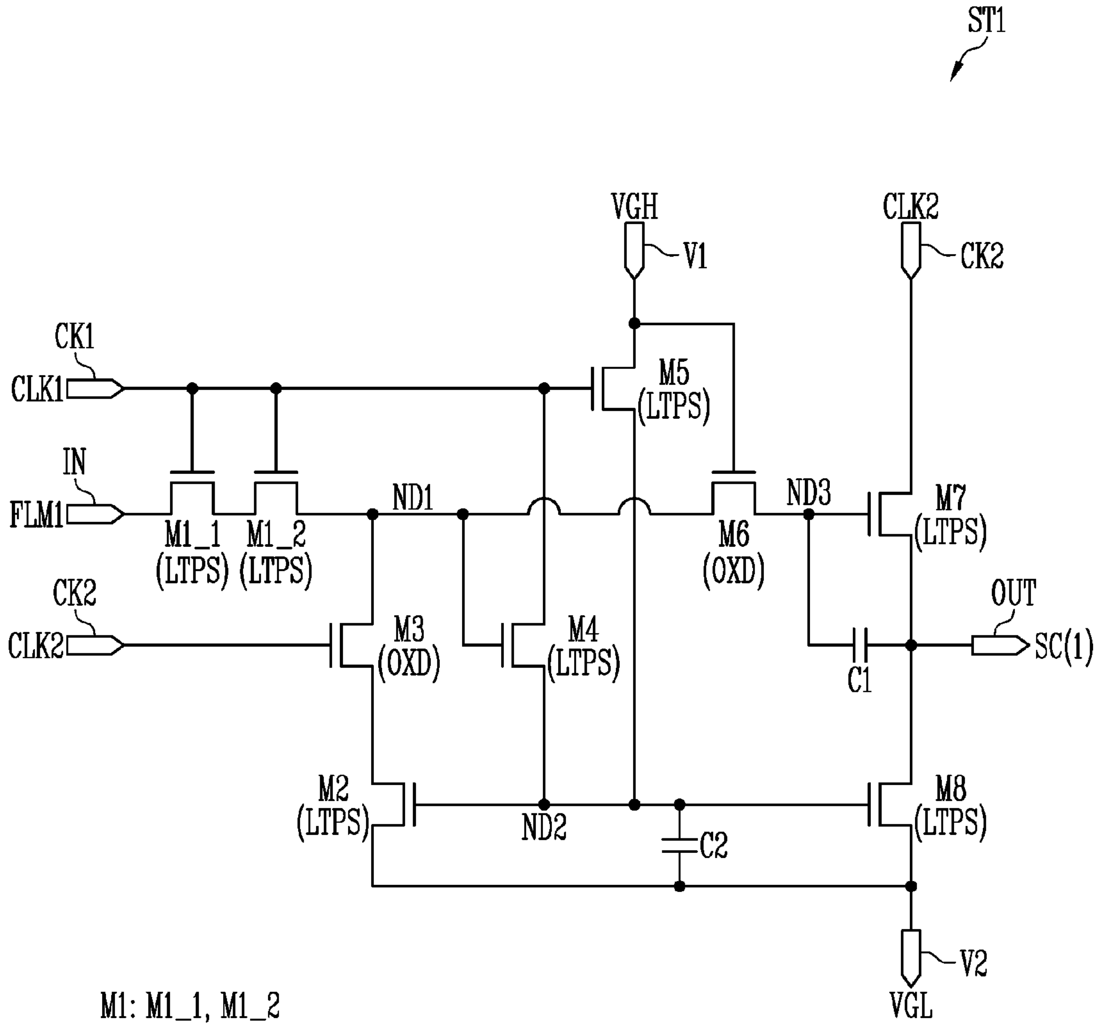
FIG. 4 is a circuit diagram illustrating an example of a stage included in a scan driver of FIG. 3.

FIG. 4 is a circuit diagram illustrating an example of a stage included in a scan driver of FIG. 3. In FIG. 4, the types of the transistors TR1~TR6 are shown in parentheses for clear explanation. For example, the oxide semiconductor transistor is written as "OXD", and the N-type low-temperature poly-silicon transistor as "LTPS".

In FIG. 4, a circuit of the first stage ST1 is illustratively shown for a clear and concise explanation. Other stages of the stages ST1, ST2, ST3, ST4 of FIG. 3 may be configured in the same way as the first stage ST1.

In embodiments, the first stage ST1 may include N-type low-temperature poly-silicon (LTPS) transistors and oxide semiconductor transistors. For example, the third and sixth transistors M3, M6 may be the oxide semiconductor transistors, and the remaining transistors M1, M2, M4, M5, M7, M8 may be the N-type low-temperature poly-silicon transistors.

The circuit of the first stage ST1 may include the first to eighth transistors M1 to M8, and the first and second capacitors C1, C2.

The first transistors M1_1, M1_2 may be connected in series between the input terminal IN, which supplies the first scan start signal FLM1, and the first node N1. The gate electrodes of the first transistors M1_1, M1_2 may be connected to the first clock terminal CK1 to which the first clock signal CLK1 is supplied.

The second and third transistors M2, M3 may be connected in series between the second power terminal V2, to which the second power VGL is supplied, and the first node ND1.

The second transistor M2 may be connected to the second power terminal V2, to which the second power VGL is supplied, and one electrode (e.g., a source electrode) of the third transistor M3. The gate electrode of the second transistor M2 may be connected to the second node ND2.

The third transistor M3 may be connected to the first node ND1 and one electrode (e.g., a drain electrode) of the second transistor M2. The gate electrode of the third transistor M3 may be connected to the second clock terminal CK2 to which the second clock signal CLK2 is supplied.

It is assumed that the third transistor M3 is formed as the low-temperature poly-silicon transistor. When charging the second capacitor C2, the voltage Vds between the drain electrode and the source electrode of the third transistor M3 may rise. For example, if the voltage Vds between the drain electrode and the source electrode of the third transistor M3 increases, the electric field may increase in a pinch-off area that is adjacent to the drain area. Electrons with high velocities and high kinetic energies as being accelerated by an increased electric field may disrupt the electrical properties of the third transistor M3. For example, the concentration of the carrier in channels may be reduced due to the increased electric field, thereby reducing the operating current of the third transistor M3 to result in a decrease in the output waveform of the circuit. For example, the hot carrier instability ("HCI") or drain avalanche hot carrier ("DAHC") phenomenon may occur in the third transistor M3. In such a case, defects in the display panel 100 such as the flickering may occur.

Taking these into consideration, the third transistor M3 may be formed as the oxide semiconductor transistor in an embodiment. For example, the oxide semiconductor transistor may have an energy bandgap of more than three times higher than that of low-temperature poly-silicon transistors, making avalanche breakdown less likely to occur. The oxide semiconductor transistor may have strong resistance and high breakdown voltages to the hot carrier instability (HCI) phenomenon. Therefore, if the third transistor M3 is formed as the oxide semiconductor transistor, the DAHC and HCI phenomena may be effectively improved. In addition, the third transistor M3 may be formed as the oxide semiconductor transistor as it does not require a high driving rate.

The fourth transistor M4 may be connected between the first clock terminal CK1, to which the first clock signal CLK1 is supplied, and the second node ND2. The gate electrode of the fourth transistor M4 may be connected to the first node ND1.

The fifth transistor M5 may be connected between the first power terminal V1, to which the first power VGH is supplied, and the second node ND2. The gate electrode of the fifth transistor M5 may be connected to the first clock terminal CK1 to which the first clock signal CLK1 is supplied.

The sixth transistor M6 may be connected between the first node ND1 and the third node ND3. The gate electrode of the sixth transistor M6 may be connected to the first power terminal V1 to which the first power VGH is supplied. The gate electrode of the sixth transistor M6 may be connected to one electrode (e.g., a drain electrode) of the fifth transistor M5.

It is assumed that the sixth transistor M6 is formed as the low-temperature poly-silicon transistor. When charging the first capacitor C1, the voltage Vds between the drain electrode and the source electrode of the sixth transistor M6 may rise. For example, if the voltage Vds between the drain electrode and the source electrode of the sixth transistor M3 increases, the electrical properties of the third transistor M3 may be disturbed by the increased electric field in the pinch-off area adjacent to the drain area. For example, the concentration of the carrier in the channel may be reduced due to the increased electric field to cause reduction in the operating current of the sixth transistor M6, thereby reducing the output waveform of the circuit. For example, the hot carrier instability (HCI) or drain avalanche hot carrier (DAHC) phenomena may occur in the sixth transistor M6. In such a case, defects in the display panel 100 such as the flickering may occur.

Taking these into consideration, the sixth transistor M6 may be formed as the oxide semiconductor transistor in an embodiment. For example, if the sixth transistor M6 is formed as the oxide semiconductor transistor with a strong resistance and high breakdown voltage to the hot carrier instability (HCI) phenomenon, the DAHC and the HCI phenomena may be improved. In addition, the sixth transistor M6 may be formed as the oxide semiconductor transistor as it does not require a high driving rate.

The seventh and eighth transistors M7, M8 may be connected in series between the second clock terminal CK2, to which the second clock signal CLK2 is supplied, and the second power terminal V2, to which the second power VGL is supplied.

The seventh transistor M7 may be connected between the second clock terminal CK2, to which the second clock signal CLK2 is supplied, and the output terminal OUT. The gate electrode of the seventh transistor M7 may be connected to the third node ND3.

The eighth transistor M8 may be connected between the second power terminal V2, to which the second power VGL is supplied, and the output terminal OUT. The gate electrode of the eighth transistor M8 may be connected to the second node ND2.

The first capacitor C1 may be connected between the third node ND3 and the output terminal OUT. One electrode of the first capacitor C1 may be connected to one electrode (e.g., a source electrode) of the sixth transistor M6 and the gate electrode of the seventh transistor M7.

The second capacitor C2 may be connected between the second node ND2 and the second power terminal V2 to which the second power VGL is supplied. One electrode of the second capacitor C2 may be connected to the gate electrodes of the second and eighth transistors M2, M8 and one electrode (e.g., a source electrode) of the fourth transistor M4. The other electrode of the second capacitor C2 may be connected to one electrode (e.g., a drain electrode) of the second transistor M2 and one electrode (e.g., a drain electrode) of the eighth transistor M8.

The remaining transistors M1, M2, M4, M5, M7, M8, except for the third and sixth transistors M3, M6 of the first to eighth transistors M1 to M8, may be formed as the N-type low-temperature poly-silicon transistors. For example, if the remaining transistors M1, M2, M4, M5, M7, M8 are formed as the N-type low-temperature poly-silicon transistors with high electron mobility, a high driving rate may be secured. In addition, by forming the third and sixth transistors M3, M6 as the oxide semiconductor transistors that are resistant to the hot carrier instability (HCI) phenomenon, it is possible to prevent degradation in the image quality by improving the DAHC and HCI phenomena.

In addition, by forming only the third and sixth transistors M3, M6 as the oxide semiconductor transistors, the number of oxide semiconductor transistors included in the stage circuits may be minimized. In other words, by minimizing the oxide semiconductor transistors, which occupy a larger area than the N-type low-temperature poly-silicon transistors, it is possible to reduce the size of the stage circuits.

The stage circuits may be included in an integrated gate driver ("IGD"). The stage circuits may be included in the IGD in which the scan drivers 200, 300, and 400 are formed directly in the display panel 100. For example, stage circuits may be formed on one edge of display panel 100 or on both edges. Accordingly, by slimming down the display device DD, it is possible to improve the external appearance and reduce costs.

Figure 5:
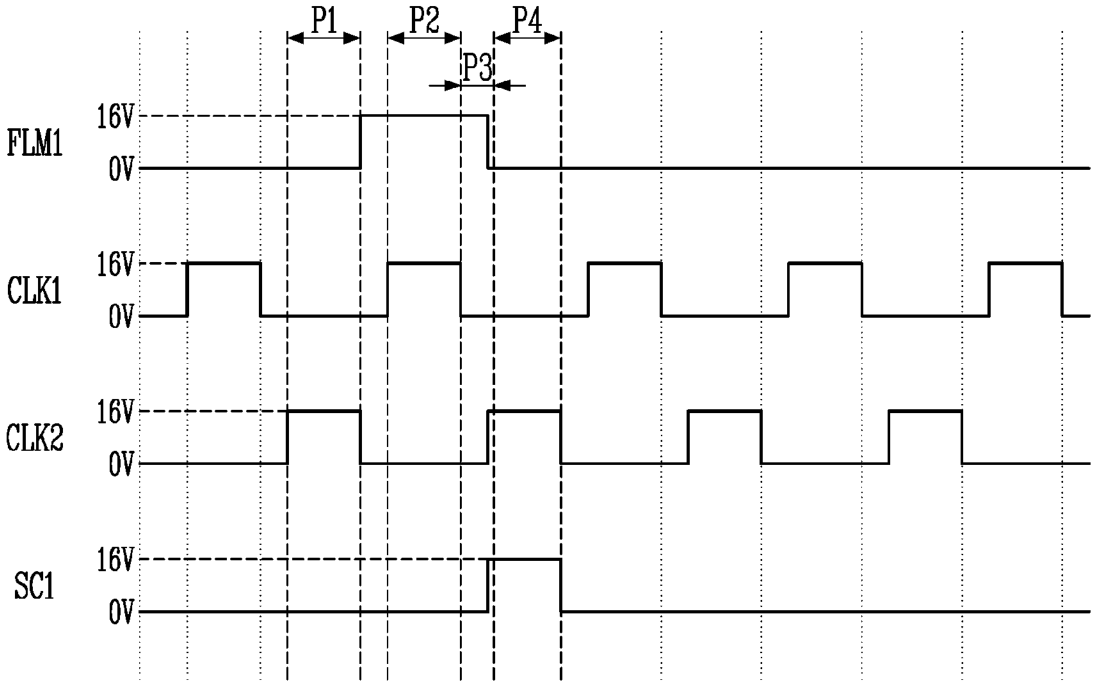
FIG. 5 is a timing diagram illustrating an example of an operation of a stage in FIG. 4.

FIG. 5 is a timing diagram illustrating an example of an operation of a stage in FIG. 4.

Referring to FIG. 4 and FIG. 5, the first scan start signal FLM1 supplied to the input terminal IN of the first stage ST1, the first clock signal CLK1 supplied to the first clock terminal CK1, the second clock signal CLK2 supplied to the second clock terminal CK2, and the first scan signal SC(1) output through the output terminal OUT are shown. Subsequently, for a clear of concise explanation, it is assumed that the high level of the first scan start signal FLM1, the first clock signal CLK1, the second clock signal CLK2, and the first scan signal SC(1) is 16 V and the low level is 0 V.

In a first period P1, the first scan start signal FLM1 may be low-level, the first clock signal CLK1 may be low-level, and the second clock signal CLK2 may be high-level. In addition, the first scan signal SC(1) may be low-level. The circuit in the first stage ST1 in the first period P1 may perform initialization operations. During the first period P1, the first to eighth transistors M1 to M8 may operate under conditions in which the drain avalanche hot carrier (DAHC) phenomenon does not occur.

In a second period P2, the first scan start signal FLM1 may be high-level, the first clock signal CLK1 may be high-level, and the second clock signal CLK2 may be low-level. In addition, the first scan signal SC(1) may be low-level. In the second period P2, the circuit in the first stage ST1 may perform initialization operations. During the second period P2, the first to eighth transistors M1 to M8 may operate under conditions in which the DAHC phenomenon does not occur.

In a third period P3, the first scan start signal FLM1 may be changed from a high level to a low level. The first clock signal CLK1 may be low-level. The second clock signal CLK2 may be changed from a low level to a high level in response to the first scan start signal FLM1. The first scan signal SC(1) may be changed from a low level to a high level in the same way as the second clock signal CLK2. In the third period P3, the circuit in the first stage ST1 may perform sensing operations. During the third period P3, the third transistor M3 may operate under conditions in which the DAHC phenomenon occurs. Thereby, the third transistor M3 may be formed as the oxide semiconductor transistor to reduce the DAHC phenomenon.

In a fourth period P4, the first scan start signal FLM1 may be low-level, the first clock signal CLK1 may be low-level, and the second clock signal CLK2 may be high-level. In addition, the first scan signal SC(1) may be high-level. In the fourth period P4, the circuit in the first stage ST1 may perform output operations of the scan signal. During the fourth period P4, the sixth transistor M6 may operate under conditions in which the DAHC phenomenon occurs. Thereby, the sixth transistor M6 may be formed as the oxide semiconductor transistor to reduce the DAHC phenomenon.

Figure 6:
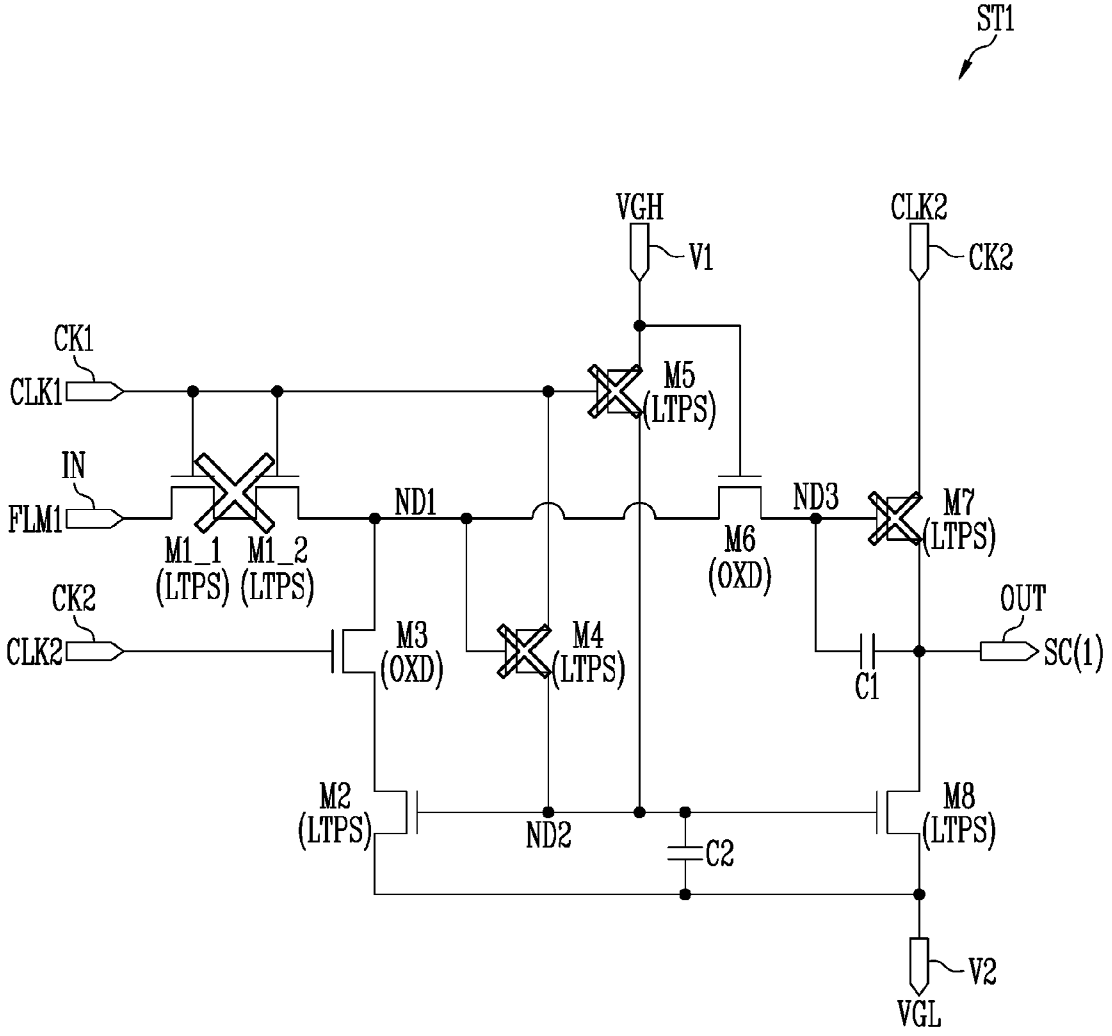

FIG. 6 and FIG. 7 are drawings for illustrating an operation of a first period of FIG. 5.

Referring to FIG. 5, FIG. 6, and FIG. 7, in the first period P1, the first transistors M1_1, M1_2, the fourth transistor M4, the fifth transistor M5, and the seventh transistor M7 may be turned off. In addition, the second transistor M2, the third transistor M3, the sixth transistor M6, and the eighth transistor M8 may be turned on.

In the first period P1, since the second clock signal CLK2 is supplied at a high level, the third transistor M3 may be turned on. If the third transistor M3 is in the turn-on state, the voltage Vgs between the gate electrode and the source electrode of the third transistor M3 may be 16 V, and the voltage Vds between the drain electrode and the source electrode of the third transistor M3 may be 0 V.

However, in the first period P1, since the first transistors M1_1, M1_2 are in the turn-off state, the seventh transistor M7 in which the second clock signal CLK2 should be supplied to one electrode (e.g., the drain electrode) may be in the turn-off state. The voltage Vgs between the gate electrode and the source electrode of the seventh transistor M7 may be 16 V, and the voltage Vds between the drain electrode and the source electrode of the seventh transistor M7 may be 16 V.

In the first period P1, if 16 V is supplied to the first power terminal V1, the sixth transistor M6 may be turned on. Since the sixth transistor M6 is in the turn-on state, the voltage Vgs between the gate electrode and the source electrode of the sixth transistor M6 may be 16 V, and the voltage Vds between the drain electrode and the source electrode of the sixth transistor M6 may be 0 V.

In the first period P1, if the voltage of the second node ND2 connected to one electrode of the second capacitor C2 is 13.1 V, the second and eighth transistors M2, M8 may be turned on. Since the second transistor M2 is in the turn-on state, the voltage Vgs between the gate electrode and the source electrode of the second transistor M2 may be 13.1 V, and the voltage Vds between the drain electrode and the source electrode of the second transistor M2 may be 0 V. Since the eighth transistor M8 is in the turn-on state, the voltage Vgs between the gate electrode and the source electrode of the eighth transistor M8 may be 13.1 V, and the voltage Vds between the drain electrode and the source electrode of the eighth transistor M8 may be 0 V.

In the first period P1, the first transistors M1_1, M1_2, the fourth transistors M4, and the fifth transistors M5 may be in the turn-off state.

Since the first transistors M1_1, M1_2 are in the turn-off state, the voltage Vgs between the gate electrode and the source electrode of the first transistors M1_1, M1_2 may be 0 V, and the voltage Vds between the drain electrode and the source electrode of the first transistors M1_1, M1_2 may be 0 V.

Since the fourth transistor M4 is in the turn-off state, the voltage Vgs between the gate electrode and the source electrode of the fourth transistor M4 may be 13.1 V, and the voltage Vds between the drain electrode and the source electrode of the fourth transistor M4 may be 13.1 V.

In addition, since the fifth transistor M5 is in the turn-off state, the voltage Vgs between the gate electrode and the source electrode of the fifth transistor M5 may be 16 V, and the voltage Vds between the drain electrode and the source electrode of the fifth transistor M5 may be 2.9 V.

As such, during the first period P1, in the first to eighth transistors M1 to M8, the DAHC phenomenon due to a voltage increase between the drain electrode and the source electrode may not occur.

Figure 8:
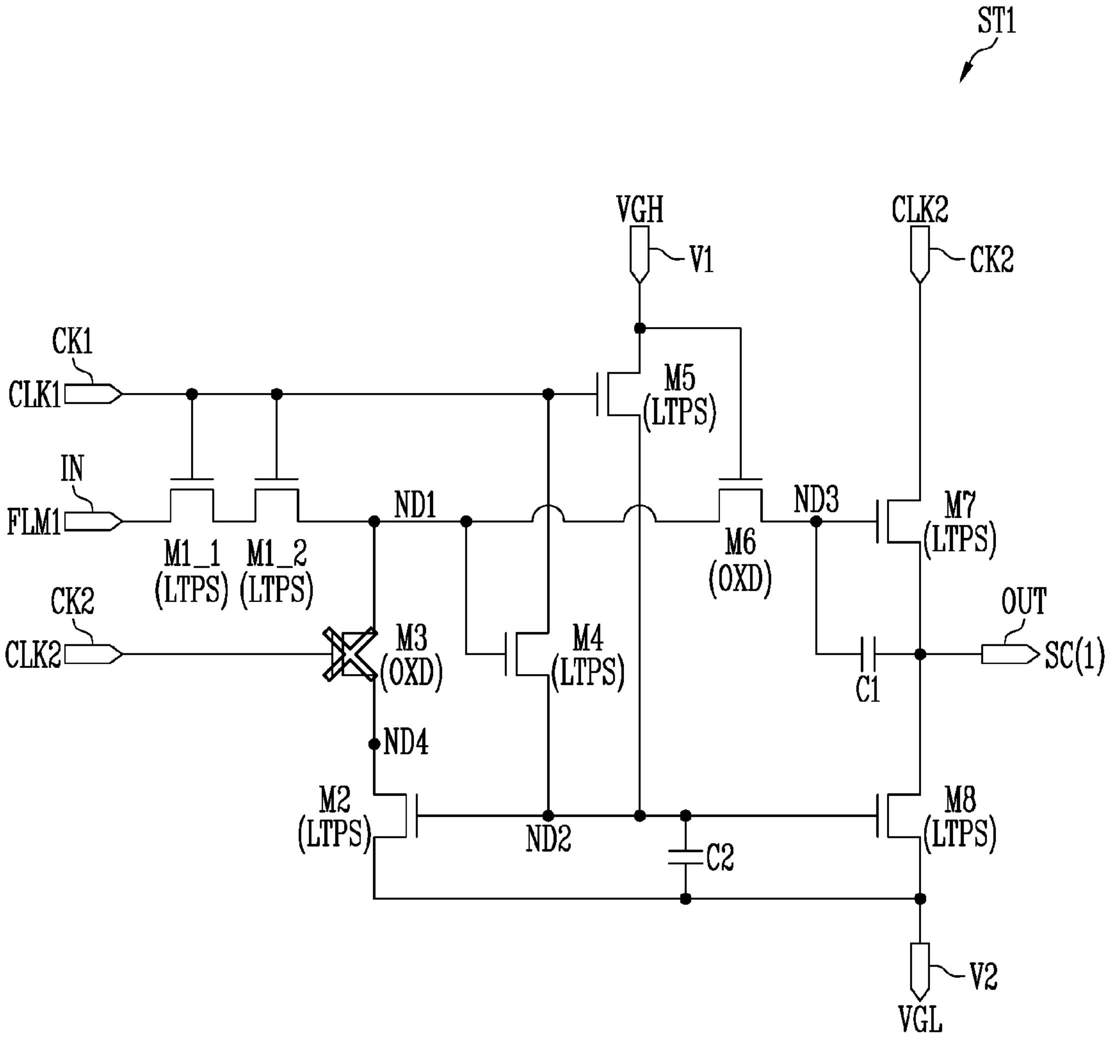

FIG. 8 and FIG. 9 are drawings for illustrating an operation of a second period of FIG. 5.

Referring to FIG. 5, FIG. 8, and FIG. 9, the third transistor M3 may be turned off in the second period P2. In addition, the first and second transistors M1_1, M1_2, M2 and the fourth to eighth transistors M4 to M8 may be turned on.

In the second period P2, since the first clock signal CLK1 is supplied at a high level, the first transistors M1_1, M1_2 may be turned on. In this case, since the first scan start signal FLM1 is supplied at a high level, the voltage Vgs between the gate electrode and the source electrode of the first transistors M1_1, M1_2, M2 may be 3.9 V, and the voltage Vds between the drain electrode and the source electrode of the first transistors M1_1, M1_2, M2 may be 3.9 V.

In the second period P2, since the first clock signal CLK1 is supplied at a high level, the fifth transistor M5 may be turned on. In this case, if 16 V is supplied to the first power terminal V1, the voltage Vgs between the gate electrode and the source electrode of the fifth transistor M5 may be 2.9 V, and the voltage Vds between the drain electrode and the source electrode of the fifth transistor M5 may be 2.9 V.

In the second period P2, since the first scan start signal FLM1 is supplied at a high level, the fourth transistor M4 may be turned on. If the fourth transistor M4 is in the turn-on state, the voltage Vgs between the gate electrode and the source electrode of the fourth transistor M4 may be 3.9 V, and the voltage Vds between the drain electrode and the source electrode of the fourth transistor M4 may be 2.9 V.

If 16 V is supplied to the first power terminal V1 in the second period P2, the sixth transistor M6 may be turned on. Since the sixth transistor M6 is in the turn-on state, the voltage Vgs between the gate electrode and the source electrode of the sixth transistor M6 may be 4 V, and the voltage Vds between the drain electrode and the source electrode of the sixth transistor M6 may be 0 V.

In addition, since the sixth transistor M6 is turned on, the seventh transistor M7 may be turned on. Since the seventh transistor M7 is in the turn-on state, the voltage Vgs between the gate electrode and the source electrode of the seventh transistor M7 may be 12 V, and the voltage Vds between the drain electrode and the source electrode of the seventh transistor M7 may be 0 V.

In the second period P2, if the voltage of the second node ND2 connected to one electrode of the second capacitor C2 is 13.1 V, the second and eighth transistors M2, M8 may be turned on.

Since the second transistor M2 is in the turn-on state, the voltage Vgs between the gate electrode and the source electrode of the second transistor M2 may be 13.1 V, and the voltage Vds between the drain electrode and the source electrode of the second transistor M2 may be 0 V. In this case, the voltage of the fourth node ND4, to which the source electrode of the second transistor M2 and the drain electrode of the third transistor M3 are connected, may be 0 V.

Since the eighth transistor M8 is in the turn-on state, the voltage Vgs between the gate electrode and the source electrode of the eighth transistor M8 may be 13.1 V, and the voltage Vds between the drain electrode and the source electrode of the eighth transistor M8 may be 0 V.

In the second period P2, since the second clock signal CLK2 is supplied at a low level, the third transistor M3 may be turned off. Since the third transistor M3 is in the turn-off state, the voltage Vgs between the gate electrode and the source electrode of the third transistor M3 may be 12.1 V, and the voltage Vds between the drain electrode and the source electrode of the third transistor M3 may be 12.1 V.

As such, during the second period P2, in the first to eighth transistors M1 to M8, the DAHC phenomenon due to the voltage increase between the drain electrode and the source electrode may not occur.

Figure 10:
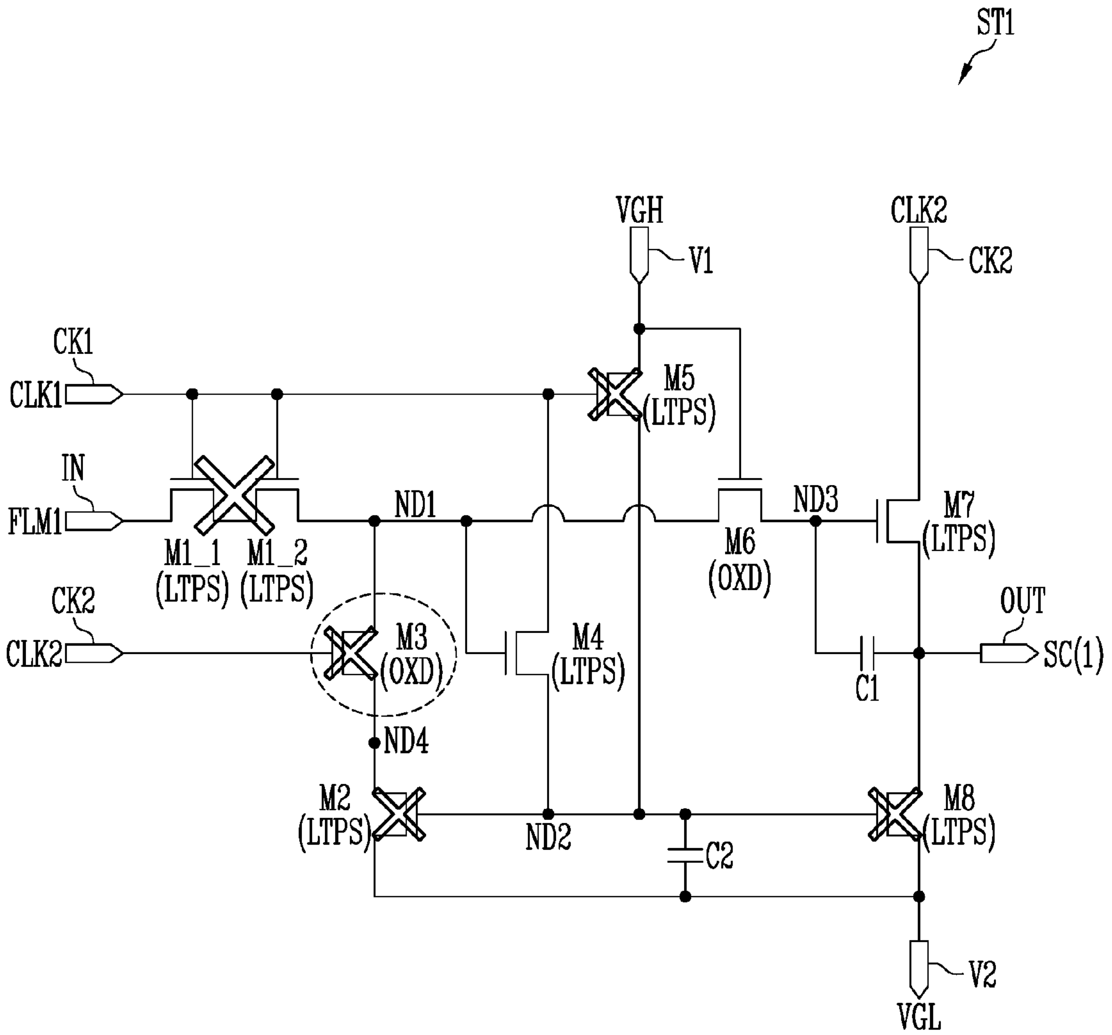

FIG. 10 and FIG. 11 are drawings for illustrating an operation of a third period of FIG. 5.

Referring to FIG. 5, FIG. 10, and FIG. 11, in the third period P3, the first transistors M1_1, M1_2, the second transistor M2, the third transistor M3, the fifth transistor M5, and the eighth transistor M8 may be turned off. In addition, the fourth transistor M4, the sixth transistor M6, and the seventh transistor M7 may be turned on.

In the third period P3, since the first clock signal CLK1 is supplied at a low level, the first transistors M1_1, M1_2 may be turned off. In this case, since the first scan start signal FLM1 is supplied at a high level, the voltage Vgs between the gate electrode and the source electrode of the first transistors M1_1, M1_2 may be 16 V, and the voltage Vds between the drain electrode and the source electrode of the first transistors M1_1, M1_2 may be 4.9 V.

In the third period P3, since the first clock signal CLK1 is supplied at a low level, the fifth transistor M5 may be turned off. In this case, if 16 V is supplied to the first power terminal V1, the voltage Vgs between the gate electrode and the source electrode of the fifth transistor M5 may be 16 V, and the voltage Vds between the drain electrode and the source electrode of the fifth transistor M5 may be 16 V.

In the third period P3, if 16 V is supplied to the first power terminal V1, the sixth transistor M6 may be turned on. Since the sixth transistor M6 is in the turn-on state, the voltage Vgs between the gate electrode and the source electrode of the sixth transistor M6 may be 4.1 V, and the voltage Vds between the drain electrode and the source electrode of the sixth transistor M6 may be 0 V. The sixth transistor M6 may be connected to one electrode of the first capacitor C1.

In this case, if the voltage of the first node ND1 connected to the sixth transistor M6 is 11.9 V, the fourth transistor M4 may be turned on. Since the fourth transistor M4 is in the turn-on state, the voltage Vgs between the gate electrode and the source electrode of the fourth transistor M4 may be 11.9 V, and the voltage Vds between the drain electrode and the source electrode of the fourth transistor M4 may be 0 V.

In addition, since the sixth transistor M6 is turned on, the seventh transistor M7 may be turned on. Since the seventh transistor M7 is in the turn-on state, the voltage Vgs between the gate electrode and the source electrode of the seventh transistor M7 may be 11.9 V, and the voltage Vds between the drain electrode and the source electrode of the seventh transistor M7 may be 0 V.

In the third period P3, if the voltage of the second node ND2 connected to one electrode of the second capacitor C2 is 0 V, the eighth transistor M8 may be turned off. Since the eighth transistor M8 is in the turn-off state, the voltage Vgs between the gate electrode and the source electrode of the eighth transistor M8 may be 0 V, and the voltage Vds between the drain electrode and the source electrode of the eighth transistor M8 may be 0 V.

In the third period P3, since the first clock signal CLK1 is changed from a high level to a low level, the fifth transistor M5 may be turned off. Thereby, if the voltage of the second node ND2 is reduced to 0 V, the second transistor M2 may be turned off. In this case, the voltage of the fourth node ND4, to which the second transistor M2 and the third transistor M3 are connected, may be changed from 0 V to −3 V. The voltage Vgs between the gate electrode and the source electrode of the second transistor M2 may be 3 V, and the voltage Vds between the drain electrode and the source electrode of the second transistor M2 may be 0 V.

In the third period P3, since the second clock signal CLK2 is supplied at a low level, the third transistor M3 may be turned off. Since the third transistor M3 is in the turn-off state, the voltage Vgs between the gate electrode and the source electrode of the third transistor M3 may be 11.9 V, and the voltage Vds between the drain electrode and the source electrode of the third transistor M3 may be 14.9 V. The voltage Vds between the drain electrode and the source electrode of the third transistor M3 may become greater than the voltage Vgs between the gate electrode and the source electrode. As the electric field between the drain electrode and the source electrode of the third transistor M3 increases, the electrical properties of the third transistor M3 may be disturbed. For example, the hot carrier instability (HCI) or drain avalanche hot carrier (DAHC) phenomena may occur in the third transistor M3.

As such, during the third period P3, in the third transistor M3, the DAHC phenomenon may take place due to the voltage increase between the drain electrode and the source electrode. Thus, the third transistor M3 may be formed as the oxide semiconductor transistor. For example, if the third transistor M3 is formed as the oxide semiconductor transistor that is resistant to the hot carrier instability (HCI) phenomenon, the DAHC and HCI phenomena that occur during the third period P3 may be suppressed.

Figure 12:
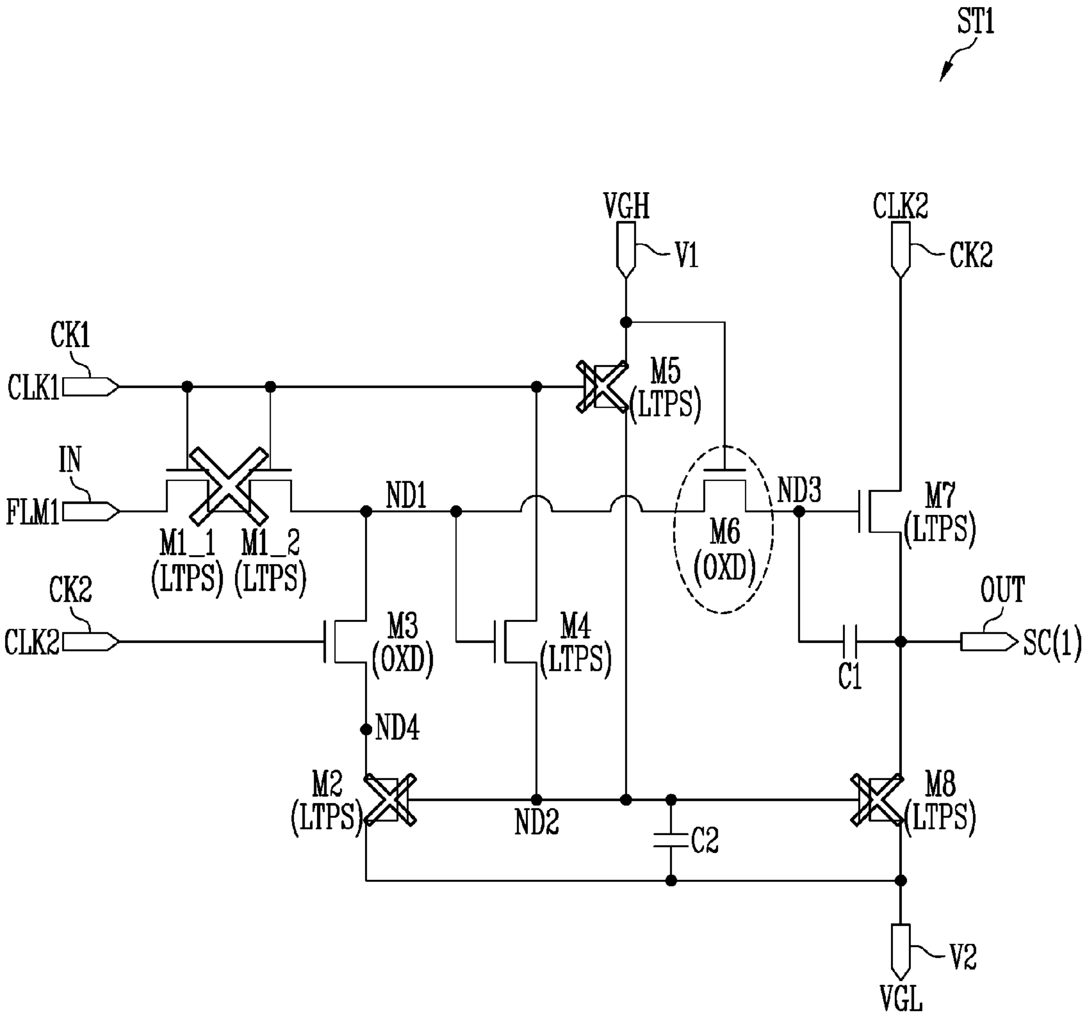

FIG. 12 and FIG. 13 are drawings for illustrating an operation of a fourth period of FIG. 5.

Referring to FIG. 5, FIG. 12, and FIG. 13, in the fourth period P4, the first transistors M1_1, M1_2, the second transistor M2, the fifth transistor M5, and the eighth transistor M8 may be turned off. In addition, the third transistor M3, the fourth transistor M4, the sixth transistor M6, and the seventh transistor M7 may be turned on.

In the fourth period P4, since the first clock signal CLK1 is supplied at a low level, the first and fifth transistors M1, M5 may be turned off. In this case, if 16 V is supplied to the first power terminal V1, the voltage Vgs between the gate electrode and the source electrode of the fifth transistor M5 may be 16 V, and the voltage Vds between the drain electrode and the source electrode of the fifth transistor M5 may be 16 V.

In the fourth period P4, if the voltage of the second node ND2 is 0 V, the second and eighth transistors M2, M8 may be turned off. In addition, when the second clock signal CLK2 is supplied to a high level, the third transistor M3 may be turned on.

In this case, the voltage of the fourth node ND4, to which the second transistor M2 and the third transistor M3 are connected, may be changed from −3 V to 12.8 V. Since the second transistor M2 is in the turn-off state, the voltage Vgs between the gate electrode and the source electrode of the second transistor M2 may be 12.8 V, and the voltage Vds between the drain electrode and the source electrode of the second transistor M2 may be 12.8 V.

In addition, if the voltage of the first node ND1 is 13 V, and the third transistor M2 is in the turn-on state, the voltage Vgs between the gate electrode and the source electrode of the third transistor M3 may be 3.2 V, and the voltage Vds between the drain electrode and the source electrode of the third transistor M3 may be 0.2 V.

Since the first scan start signal FLM1 is supplied at a low level, the voltage of the first node ND1 is 13 V, and the first transistor M1 is in the turn-off state, the voltage Vgs between the gate electrode and the source electrode of the first transistor M1 may be 13 V, and the voltage Vds between the drain electrode and the source electrode of the first transistor M1 may be 13 V.

In the fourth period P4, if the voltage of the first node ND1 is 13 V, the fourth transistor M4 may be turned on. Since the fourth transistor M4 is in the turn-on state, the voltage Vgs between the gate electrode and the source electrode of the fourth transistor M4 may be 13 V, and the voltage Vds between the drain electrode and the source electrode of the fourth transistor M4 may be 0 V.

In this case, if 16 V is supplied to the first power terminal V1 in the fourth period P4, the sixth transistor M6 may be turned on. Since the sixth transistor M6 is turned on, the seventh transistor M7 may be turned on. Since the seventh transistor M7 is in a turn-on state, it may output 16V to the output terminal OUT. Accordingly, the first capacitor C1 connected between the gate electrode and the output terminal OUT of the seventh transistor M7 may be charged. Due to the voltage charged in the first capacitor C1, the voltage of the third node N3 may be 27.7 V.

Since the seventh transistor M7 is in a turn-on state, the voltage Vgs between the gate electrode and the source electrode of the seventh transistor M7 may be 11.7 V, and the voltage Vds between the drain electrode and the source electrode of the seventh transistor M7 may be 0 V.

Since the eighth transistor M8 is in the turn-off state, the voltage Vgs between the gate electrode and the source electrode of the eighth transistor M8 may be 16 V, and the voltage Vds between the drain electrode and the source electrode of the eighth transistor M8 may be 16 V.

Since the sixth transistor M6 is in the turn-on state, the voltage Vgs between the gate electrode and the source electrode of the sixth transistor M6 may be 11.7 V, and the voltage Vds between the drain electrode and the source electrode of the sixth transistor M6 may be 14.7 V. Accordingly, the voltage Vds between the drain electrode and the source electrode of the sixth transistor M6 may be greater than the voltage Vgs between the gate electrode and the source electrode. In other words, as the electric field between the drain electrode and the source electrode of the sixth transistor M6 increases, the electrical properties of the sixth transistor M6 may be disturbed. For example, the hot carrier instability (HCI) or drain avalanche hot carrier (DAHC) phenomena may take place in the sixth transistor M6.

Thus, during the fourth period P4, in the sixth transistor M6, the DAHC phenomenon may occur due to a voltage increase between the drain electrode and the source electrode. Thus, the sixth transistor M6 may be formed as the oxide semiconductor transistor. For example, if the sixth transistor M6 is formed as the oxide semiconductor transistor that is resistant to the hot carrier instability (HCI) phenomenon, the DAHC and HCI phenomena taking place during the fourth period P4 may be suppressed. In addition, by forming the sixth transistor M6 connected to one electrode of the first capacitor C1 as the oxide semiconductor transistor, the leakage current from the third node ND3 may be minimized.

Figure 14:
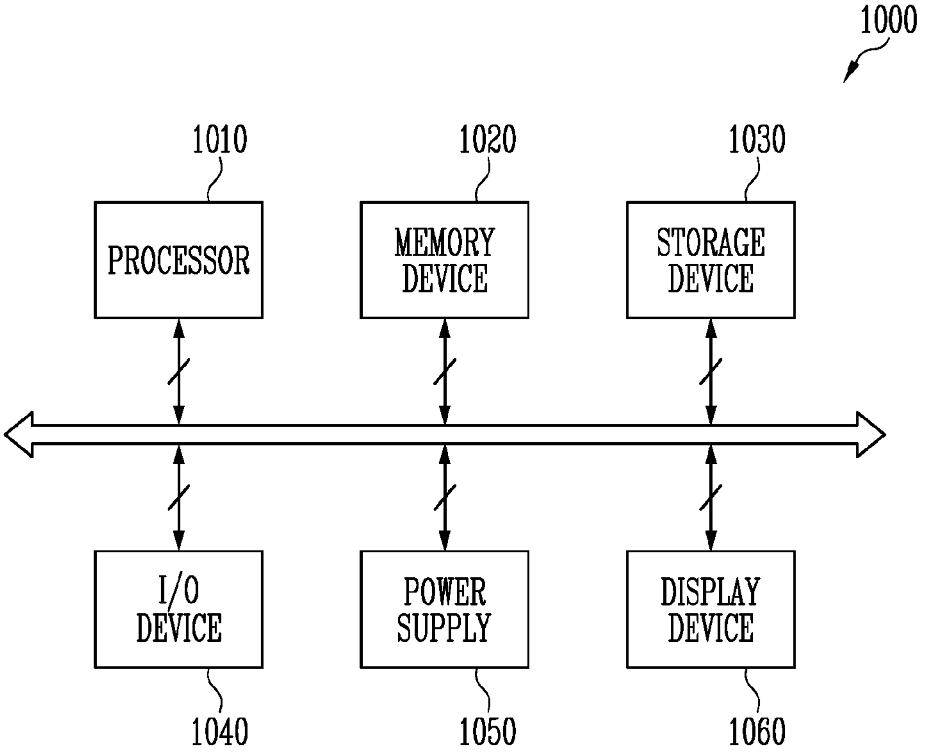
FIG. 14 is a schematic block diagram illustrating an embodiment of an electronic device including a display device according to an embodiment of the present disclosure.

FIG. 14 is a schematic block diagram illustrating an embodiment of an electronic device including a display device according to an embodiment of the present disclosure.

Referring to FIG. 14, an electronic device 1000 may include a processor 1010, a memory device 1020, a storage device 1030, an I/O device 1040, a power supply 1050, and a display device 1060. The display device 1060 may be the display device DD of FIG. 1. In addition, the electronic device 1000 may further include several ports capable of communicating with video cards, sound cards, memory cards, and USB devices, or communicating with other systems. In one embodiment, the electronic device 1000 may be implemented as a smartphone. In another embodiment, the electronic device 1000 may be implemented as a tablet PC. However, it is illustrative only and is not limited to the electronic devices 1000. For example, the electronic device 1000 may be implemented as a mobile phone, video phone, smart pad, smart watch, vehicle navigation, computer monitor, laptop, and head-mounted display device.

The processor 1010 may perform certain calculations or tasks. According to embodiments, the processor 1010 may be a microprocessor, a central processing unit, and an application processor. The processor 1010 may be connected to other components through an address bus, a control bus, and a data bus. According to embodiments, the processor 1010 may be connected to extended buses such as peripheral component interconnect ("PCI") buses. According to embodiments, the processor 1010 may provide input image data to the display device 1060, whereby the display device 1060 may display images based on the input image data provided from the processor 1010.

The memory device 1020 may store data necessary for the operation of the electronic device 1000. For example, the memory device 1020 may be non-volatile memory devices, such as an Erasable Programmable Read-Only Memory ("EPROM") device, an Electrically Erasable Programmable Read-Only Memory ("EEPROM") device, a flash memory device, a Phase Change Random Access Memory ("PRAM") device, a Resistance Random Access Memory ("RRAM") device, a Nano Floating Gate Memory ("NFGM") device, a Polymer Random Access Memory ("PoRAM") device, a Magnetic Random Access Memory ("MRAM"), and a Ferroelectric Random Access Memory ("EFRAM") device, and/or volatile memory devices such as a Dynamic Random Access Memory ("DRAM") device, a Static Random Access Memory ("SRAM") device, and a mobile DRAM device.

The storage device 1030 may include a solid state drive ("SSD"), a hard disk drive ("HDD"), and a CD-ROM.

The I/O device 1040 may include input means such as keyboards, keypads, touchpads, touchscreens, and mouses, as well as output means such as speakers and printers. According to embodiments, the display device 1060 may be included in the I/O device 1040.

The power supply 1050 may supply power required for the operation of the electronic device 1000. For example, the power supply 1050 may be a power management integrated circuit (PMIC). According to embodiments, the power supply 1050 may supply power to the display device 1060. In another embodiment, a power supply is inside the display device 1060 (See FIG. 1).

The display device 1060 may display an image corresponding to visual information of the electronic device 1000. The display device 1060 may be connected to other components through the buses or other communication links.

In the pixel according to the embodiments of the present disclosure and the display device including the same, by using the pixel in combination with the N-type low-temperature poly-silicon transistors and the oxide semiconductor transistors, it is possible to improve the display quality of the display device. Furthermore, in case of the stage circuit of the scan driver to drive the pixels, by using in combination with the oxide semiconductor transistors based on the N-type low-temperature poly-silicon transistors, it is possible to suppress defects of the display panel such as flickering while securing fast driving rate.

According to embodiments of the present disclosure, there are provided a pixel with an improved reliability and a display device including the same. For example, the pixel may improve the front-of-screen (FOS) performance of the display device using N-type low-temperature poly-silicon (LTPS) transistors and oxide semiconductor transistors in combination.

Effects according to embodiments are not limited to those exemplified above, and more diverse effects are included in the present specification.

Although specific embodiments and applications are described herein, other embodiments and modifications may be derived from the above description. Thus, the idea of the present disclosure is not limited to these embodiments, but extends to the appended claims, various obvious modifications, and equivalents.

What is claimed is:

1. An electronic device, comprising:

a processor to provide input image data; and a display device to display an image based on the input image data, the display device including pixels, wherein any one pixel among the pixels includes:

a first transistor, which has a gate electrode connected to a first node and is connected between a second node and a first drive power node to which a first drive power is supplied;

a second transistor connected between a data line and the first node and having a gate electrode electrically connected to a first scan line;

a third transistor connected between a reference power node, to which a reference power is supplied, and the first node and having a gate electrode electrically connected to a second scan line;

a fourth transistor connected between an initialization power node, to which an initialization power is supplied, and a third node and having a gate electrode electrically connected to a third scan line;

a fifth transistor connected between the first drive power node and the first transistor and having a gate electrode electrically connected to a first light emitting control line;

a sixth transistor connected between the second node and the third node and having a gate electrode electrically connected to a second light emitting control line; and a light emitting element connected to the third node, wherein the fourth transistor, the fifth transistor, and the sixth transistor are N-type low-temperature poly-silicon (LTPS) transistors.

2. The electronic device according to claim 1, wherein the first transistor is an oxide semiconductor transistor.

3. The electronic device according to claim 2, wherein the second and third transistors are the oxide semiconductor transistors.

4. The electronic device according to claim 1, further comprising:

a first capacitor connected between the first node and the second node; and a second capacitor connected between the first drive power node and the second node.

5. The electronic device according to claim 4, wherein the first transistor further comprises a back gate electrode connected to one electrode of the second capacitor and the second node.

6. The electronic device according to claim 1, wherein the light emitting element is connected between the third node and a second drive power node to which a second drive power is supplied.

7. A display device, comprising:

pixels connected with scan lines, light emitting control lines, and data lines; and a scan driver for driving the scan lines, wherein any one of the pixels comprises:

a first transistor, which has a gate electrode connected to a first node and is connected between a second node and a first drive power node to which a first drive power is supplied;

a second transistor connected between a data line and the first node and having a gate electrode electrically connected to a first scan line of the scan lines;

a third transistor connected between a reference power node, to which a reference power is supplied, and the first node and having a gate electrode electrically connected to a second scan line of the scan lines;

a fourth transistor connected between an initialization power node, to which an initialization power is supplied, and a third node and having a gate electrode electrically connected to a third scan line of the scan lines;

a fifth transistor connected between the first drive power node and the first transistor and having a gate electrode electrically connected to a first light emitting control line of the light emitting control lines;

a sixth transistor connected between the second node and the third node and having a gate electrode electrically connected to a second light emitting control line of the light emitting control lines; and a light emitting element connected to the third node, p1 wherein the fourth transistor, the fifth transistor, and the sixth transistor are N-type low-temperature poly-silicon (LTPS) transistors.

8. The display device according to claim 7, wherein the first transistor is an oxide semiconductor transistor.

9. The display device according to claim 8, wherein the second and third transistors are the oxide semiconductor transistors.

10. The display device according to claim 7, further comprising:

a first capacitor connected between the first node and the second node; and a second capacitor connected between the first drive power node and the second node.

11. The display device according to claim 7, wherein the scan driver comprises stage circuits, which are connected with the scan lines, and wherein any one of the stage circuits comprises:

seventh transistors connected in series between an input terminal and a fourth node and having gate electrodes connected to a first clock terminal to which a first clock signal is supplied;

eighth and ninth transistors connected in series between a second power terminal, to which a second power is supplied, and the fourth node;

a tenth transistor connected between the first clock terminal and a fifth node and having a gate electrode connected to the fourth node;

an eleventh transistor connected between a first power terminal, to which a first power is supplied, and the fifth node and having a gate electrode connected to the first clock terminal;

a twelfth transistor connected between the fourth node and a sixth node and having a gate electrode connected to the first power terminal;

a thirteenth transistor connected between a second clock terminal, to which a second clock signal is supplied, and an output terminal and having a gate electrode connected to the sixth node; and a fourteenth transistor connected between the output terminal and the second power terminal and having a gate electrode connected to the fifth node.

12. The display device according to claim 11, wherein the seventh transistors, the eighth transistor, the tenth transistor, the eleventh transistor, the thirteenth transistor, and the fourteenth transistor are N-type low-temperature poly-silicon (LTPS) transistors.

13. The display device according to claim 12, wherein the ninth transistor and the twelfth transistor are oxide semiconductor transistors.

14. The display device according to claim 11, wherein a gate electrode of the eighth transistor is connected to the fifth node, and a gate electrode of the ninth transistor is connected to the second clock terminal.

15. The display device according to claim 11, wherein any one of the stage circuits further comprises:

a third capacitor connected between the sixth node and the output terminal; and a fourth capacitor connected between the fifth node and the second power terminal.

16. The display device according to claim 11, further comprising a timing controller for controlling the scan driver, wherein the input terminal receives a start signal from the timing controller, and the output terminal outputs a scan signal to any one of the scan lines in response to the first and second clock signals.

17. The display device according to claim 11, wherein the first power has a higher voltage than the second power.

18. The display device according to claim 11, wherein the stage circuits are included in an integrated gate driver (IGD).

19. A display device comprising:

pixels connected with scan lines, light emitting control lines, and data lines; and a scan driver for driving the scan lines, wherein the scan driver comprises stage circuits, which are connected with the scan lines, wherein any one of the stage circuits comprises:

first transistors connected in series between an input terminal and a first node and having gate electrodes connected to a first clock terminal to which a first clock signal is supplied;

second and third transistors connected in series between a second power terminal, to which a second power is supplied, and the first node;

a fourth transistor connected between the first clock terminal and a second node and having a gate electrode connected to the first node;

a fifth transistor connected between a first power terminal, to which a first power is supplied, and the second node and having a gate electrode connected to the first clock terminal;

a sixth transistor connected between the first node and a third node and having a gate electrode connected to the first power terminal;

a seventh transistor connected between a second clock terminal, to which a second clock signal is supplied, and an output terminal and having a gate electrode connected to the third node; and an eighth transistor connected between the output terminal and the second power terminal and having a gate electrode connected to the second node.

20. The display device according to claim 19, wherein the third transistor and the sixth transistor are oxide semiconductor transistors, and wherein the first transistors, the second transistor, the fourth transistor, the fifth transistor, the seventh transistor, and the eighth transistor are N-type low-temperature poly-silicon transistors.

* * * * *